(12) United States Patent
Honda

(10) Patent No.: US 9,935,330 B2
(45) Date of Patent: Apr. 3, 2018

(54) BATTERY MANUFACTURING METHOD AND BATTERY MANUFACTURING APPARATUS

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/479,340

(22) Filed: Apr. 5, 2017

(65) Prior Publication Data

US 2017/0309947 A1 Oct. 26, 2017

(30) Foreign Application Priority Data

Apr. 25, 2016 (JP) ................. 2016-086778

(51) Int. Cl.
| | |
|---|---|
| B32B 41/00 | (2006.01) |
| H01M 10/04 | (2006.01) |
| H01M 10/0525 | (2010.01) |
| H01M 6/00 | (2006.01) |
| H01M 6/02 | (2006.01) |
| B32B 15/20 | (2006.01) |
| B32B 15/18 | (2006.01) |
| H01M 4/66 | (2006.01) |
| B32B 15/04 | (2006.01) |

(Continued)

(52) U.S. Cl.
CPC ......... *H01M 10/0468* (2013.01); *B32B 15/04* (2013.01); *B32B 15/18* (2013.01); *B32B 15/20* (2013.01); *B32B 37/0046* (2013.01); *B32B 37/10* (2013.01); *H01M 4/662* (2013.01); *H01M 6/005* (2013.01); *H01M 6/02* (2013.01); *H01M 10/0404* (2013.01); *H01M 10/0525* (2013.01); *B32B 2307/202* (2013.01); *B32B 2311/12* (2013.01); *B32B 2311/30* (2013.01); *B32B 2457/10* (2013.01)

(58) Field of Classification Search
CPC .... H01M 10/0468; H01M 4/662; H01M 6/02; H01M 6/005; H01M 10/0525; B32B 15/18; B32B 37/10; B32B 15/04; B32B 37/0046; B32B 15/20; B32B 2311/12; B32B 2307/202; B32B 2457/10; B32B 2311/30
USPC .................... 156/60, 64, 350, 351, 378, 379
See application file for complete search history.

(56) References Cited

U.S. PATENT DOCUMENTS

2014/0361065 A1* 12/2014 Ishimatsu ......... H01M 10/0409
226/38

FOREIGN PATENT DOCUMENTS

JP 2012-089388 5/2012

\* cited by examiner

*Primary Examiner* — Michael N Orlando
*Assistant Examiner* — Joshel Rivera
(74) *Attorney, Agent, or Firm* — McDermott Will & Emery LLP

(57) ABSTRACT

In a battery manufacturing method using a battery manufacturing apparatus, the battery manufacturing apparatus including a pressing unit, a measurement device, and a controller, the battery manufacturing method includes steps of (a) pressing a battery member by a pressing unit, (b) measuring, after the pressing step (a), by the measurement device, characteristics of the battery member, which has been pressed by the pressing unit, and (c) controlling, after the measurement step (b), by the controller, a state of pressing of the battery member by the pressing unit in (Continued)

accordance with a measurement result of the measurement device.

14 Claims, 16 Drawing Sheets

(51) Int. Cl.
    *B32B 37/10*     (2006.01)
    *B32B 37/00*     (2006.01)

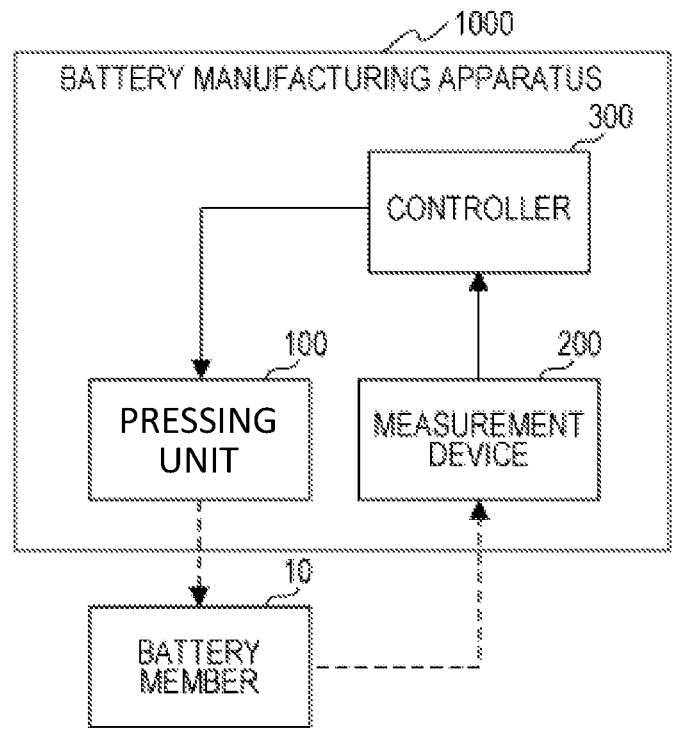
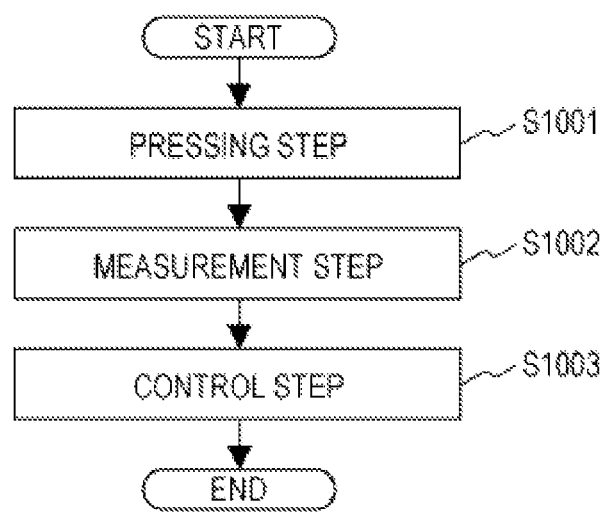

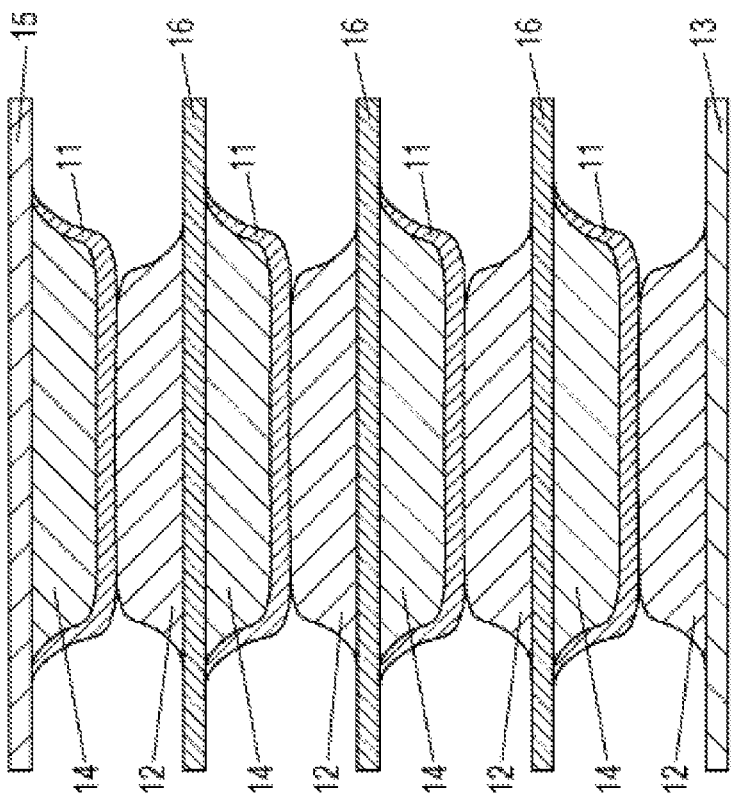
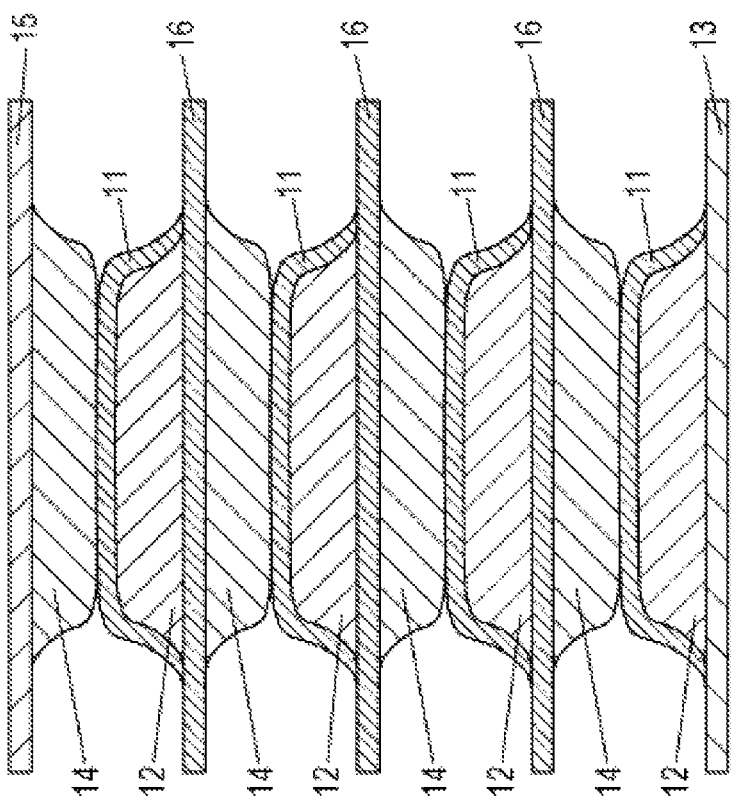

BATTERY MANUFACTURING METHOD AND BATTERY MANUFACTURING APPARATUS

BACKGROUND

1. Technical Field

The present disclosure relates to a battery manufacturing method and a battery manufacturing apparatus.

2. Description of the Related Art

Japanese Unexamined Patent Application Publication No. 2012-089388 discloses a pressing method that applies vibration at the same time as pressing.

SUMMARY

Pressing a battery member in a satisfactory manner without undergoing excessive and insufficient conditions is demanded in the related art.

In one general aspect, the techniques disclosed here feature a battery manufacturing method using a battery manufacturing apparatus, the battery manufacturing apparatus including a pressing unit, a measurement device, and a controller, wherein the battery manufacturing method includes steps of (a) pressing a battery member by the pressing unit, (b) measuring, after the pressing step (a), by the measurement device, characteristics of the battery member, which has been pressed by the pressing unit, and (c) controlling, after the measurement step (b), by the controller, a state of pressing state of the battery member by the pressing unit in accordance with a measurement result of the measurement device.

In another general aspect, the techniques disclosed here feature a battery manufacturing apparatus including a pressing unit that presses a battery member, a measurement device that measures characteristics of the battery member having been pressed by the pressing unit, and a controller that controls a state of pressing of the battery member by the pressing unit in accordance with a measurement result of the measurement device.

According to the present disclosure, the battery member can be pressed in a satisfactory manner without undergoing excessive and insufficient conditions.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram schematically illustrating a configuration of one battery manufacturing apparatus according to a first embodiment;

FIG. 2 is a flowchart illustrating a battery manufacturing method according to the first embodiment;

FIGS. 14A and 14B are each a sectional view schematically illustrating still another configuration of the battery member;

DETAILED DESCRIPTION

Figure 3:
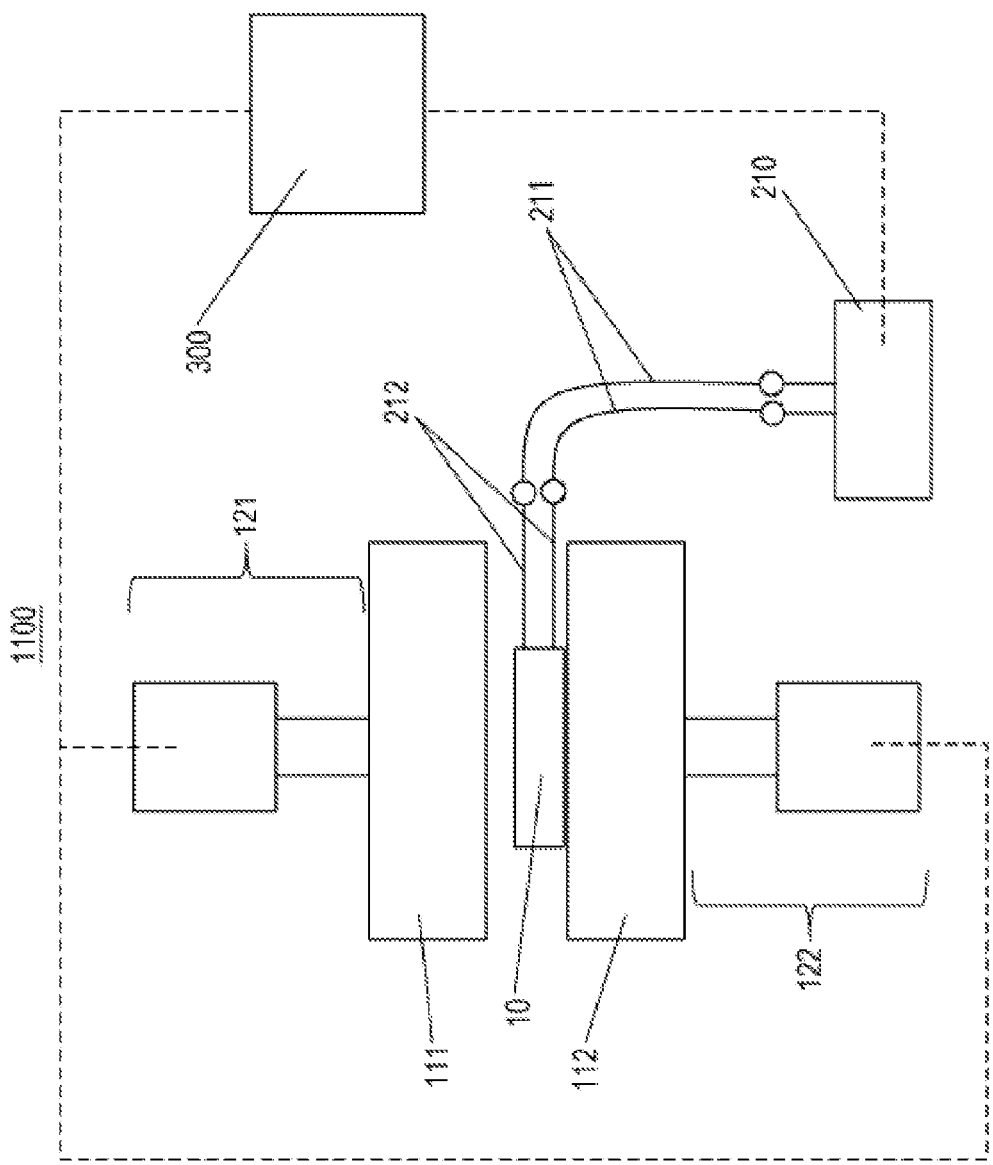
FIG. 3 is a block diagram schematically illustrating a configuration of another battery manufacturing apparatus according to the first embodiment.

Embodiments of the present disclosure will be described below with reference to the drawings.

First Embodiment

FIG. 1 is a block diagram schematically illustrating a configuration of a battery manufacturing apparatus 1000 according to a first embodiment.

The battery manufacturing apparatus 1000 according to the first embodiment includes a pressing unit 100, a measurement device 200 (i.e., measuring unit), and a controller 300 (i.e., controlling unit).

The pressing unit 100 presses a battery member 10.

The measurement device 200 measures characteristics of the battery member 10 that has been pressed by the pressing unit 100.

The controller 300 controls a state of pressing of the battery member 10 by the pressing unit 100 in accordance with a measurement result of the measurement device 200. For example, the controller 300 changes the state of the pressing of the battery member 10 by the pressing unit 100 in accordance with the measurement result of the measurement device 200.

FIG. 2 is a flowchart illustrating a battery manufacturing method according to the first embodiment.

The battery manufacturing method according to the first embodiment is a battery manufacturing method utilizing the battery manufacturing apparatus 1000 according to the first embodiment. The battery manufacturing method according to the first embodiment is, for example, a battery manufacturing method carried out in the battery manufacturing apparatus 1000 according to the first embodiment.

The battery manufacturing method according to the first embodiment includes a pressing step S1001 (=step (a)), a measurement step S1002 (=step (b)), and a control step S1003 (=step (c)).

The pressing step S1001 is a step of pressing the battery member 10 by the pressing unit 100.

The measurement step S1002 is a step executed after the pressing step S1001. The measurement step S1002 is a step of measuring, by the measurement device 200, the characteristics of the battery member 10 that has been pressed by the pressing unit 100.

The control step S1003 is a step executed after the measurement step S1002. The control step S1003 is a step of controlling, by the controller 300, the state of the pressing of the battery member 10 by the pressing unit 100 in accordance with a measurement result of the measurement device 200. For example, the control step S1003 is a step of changing, by the controller 300, the state of the pressing of the battery member 10 by the pressing unit 100 in accordance with a measurement result of the measurement device 200.

According to the manufacturing apparatus or the manufacturing method described above, the battery member 10 can be pressed in a satisfactory manner without undergoing excessive and insufficient conditions. In other words, the battery member 10 can be avoided from being damaged due to excessive pressing, for example. Furthermore, density of materials inside the battery member 10 or adhesion between a solid electrolyte and an electrode material therein can be avoided from becoming insufficient due to insufficient pressing, for example.

The pressing unit 100 may include, e.g., a pressing member and a moving unit.

The pressing member is a member that contacts the battery member 10 and presses the battery member 10 in a pressing operation. The pressing member may be, e.g., a pressing jaw.

The moving unit is connected to the pressing member. The moving unit moves the pressing member. The moving unit may be, for example, a cylinder.

The state of the pressing state of the battery member 10 by the pressing member may be controlled by the moving unit that is controlled by the controller 300.

The controller 300 may be constituted, for example, by a processor and a memory. The processor may be, e.g., a CPU (Central Processing Unit) or an MPU (Micro-Processing Unit). In that case, the processor may execute a control method (battery manufacturing method) set forth in the present disclosure by reading a program stored in the memory, and by running the program.

Moreover, in the battery manufacturing apparatus 1000 according to the first embodiment, the controller 300 may control pressing pressure, which is applied to the battery member 10 by the pressing unit 100, in accordance with the measurement result.

Stated in another way, in the battery manufacturing method according to the first embodiment, the control step S1003 may include a pressing pressure control step (=step (c1)) of controlling, by the controller 300, the pressing pressure, which is applied to the battery member 10 by the pressing unit 100, in accordance with the measurement result.

According to the manufacturing apparatus or the manufacturing method described above, the battery member 10 can be pressed under proper pressure. As a result, the battery member 10 can be pressed without applying the pressing pressure at an excessive or insufficient level.

The "control of the pressing pressure" may imply, for example, a process of changing (increasing or reducing) the pressing pressure.

Moreover, in the battery manufacturing apparatus 1000 according to the first embodiment, the controller 300 may control a time of pressing performed on the battery member 10 by the pressing unit 100 in accordance with the measurement result.

Stated in another way, in the battery manufacturing method according to the first embodiment, the control step S1003 may include a pressing time control step (=step (c2)) of controlling, by the controller 300, the time of the pressing, which is performed on the battery member 10 by the pressing unit 100, in accordance with the measurement result.

According to the manufacturing apparatus or the manufacturing method described above, the battery member 10 can be pressed for a proper pressing time. As a result, the battery member 10 can be pressed without undergoing the too long or short pressing time.

The "control of the pressing time" may imply, for example, a process of changing (prolonging or shortening) the pressing time.

In the battery manufacturing apparatus 1000 and the battery manufacturing method according to the first embodiment, the controller 300 (control step S1003) may bring the pressing operation to an end through the predetermined procedure, for example, when a characteristic of the battery member 10 measured by the measurement device 200 reaches a value set in advance, or when a prescribed measurement signal is detected by the measurement device 200, or when a prescribed measurement signal is no longer detected by the measurement device 200.

In the above case, the pressing operation may be ended, for example, in a manner of stopping the pressing at once, a manner of gradually reducing the pressing pressure, a manner of stopping the pressing after a certain time, a manner of reducing the pressing pressure while referring to the measurement signal of the measurement device 200, or a combined manner of two or more among the above-mentioned manners.

[Exemplary Configurations of Battery Manufacturing Apparatus]

Practical exemplary configurations of the battery manufacturing apparatus will be described below.

FIG. 3 is a block diagram schematically illustrating a configuration of another battery manufacturing apparatus 1100 according to the first embodiment.

The battery manufacturing apparatus 1100 according to the first embodiment includes the following configuration in addition to the configuration of the above-described battery manufacturing apparatus 1000.

More specifically, the battery manufacturing apparatus 1100 according to the first embodiment includes, as the pressing unit 100, a pressing jaw 111, a pressing jaw 112, a cylinder 121, and a cylinder 122.

The pressing jaw 111 and the pressing jaw 112 serving as a pair of upper and lower pressing jaws sandwich the battery member 10 therebetween from above and below, respectively.

The pressing jaw 111 and the pressing jaw 112 may be each, for example, a metal flat plate, an metal flat plate with an insulating coating, a ceramic flat plate, or a rubber flat plate. Alternatively, the pressing jaw 111 and the pressing jaw 112 may be each, for example, a convex or concave plate having a curvature, a roller-like member, or a bag-like member filled with gas or a liquid.

The cylinder 121 is connected to the pressing jaw 111. The cylinder 121 moves the pressing jaw 111. Thus, the pressing jaw 111 is moved up and down by the cylinder 121.

The cylinder 122 is connected to the pressing jaw 112. The cylinder 122 moves the pressing jaw 112. Thus, the pressing jaw 112 is moved up and down by the cylinder 122.

A method utilizing, e.g., air pressure, water pressure, oil pressure, a direct-operated motor, or a screw may be used as appropriate to drive the cylinder 121 and the cylinder 122.

It is to be noted that, in the pressing operation, the pressing may be performed with the pressing jaw 111 alone by driving only the cylinder 121. In that case, the battery manufacturing apparatus 1100 according to the first embodiment may be constituted without including the cylinder 122. Thus, the pressing jaw 112 may be a member that is fixedly positioned.

The battery manufacturing apparatus 1100 according to the first embodiment further includes, as the measurement device 200, an instrument unit 210, a probe unit 211, and a terminal unit 212.

The terminal unit 212 may be attached to the pressing jaw. Alternatively, when the battery member 10 includes a current collector, the current collector may be used as the terminal unit 212. The terminal unit 212 may be in the form of, e.g., an electrode, a piezoelectric element, a temperature sensing element. As an alternative, the pressing jaw 111 and the pressing jaw 112 may be each used as the terminal unit 212.

The probe unit 211 is connected to the terminal unit 212. The probe unit 211 introduces a signal from the terminal unit 212 to the instrument unit 210. The probe unit 211 may be in the form of, e.g., an electric wire or an optical fiber. Furthermore, the probe unit 211 may be provided in one line, two lines, or three or more lines.

The instrument unit 210 is connected to the probe unit 211. The instrument unit 210 measures a signal from the probe unit 211. The instrument unit 210 may be, for example, a resistance meter, a charging and discharging device, a voltmeter, an ammeter, a temperature sensor, a camera, or an acoustic meter. The instrument unit 210 and the controller 300 may be constituted into an integral structure.

In the battery manufacturing apparatus 1000 according to the first embodiment, the characteristics measured by the measurement device 200 may be electrical characteristics.

Stated in another way, in the battery manufacturing method according to the first embodiment, the characteristics measured by the measurement device 200 in the measurement step S1002 may be electrical characteristics.

According to the manufacturing apparatus or the manufacturing method described above, the degree of contact between the solid electrolyte and the electrode material, for example, can be measured with higher accuracy during the pressing of the battery member 10. As a result, the control of the pressing state by the controller can be performed with higher accuracy. Hence the battery member 10 can be pressed in a satisfactory manner without undergoing excessive and insufficient conditions.

A parameter of the above-mentioned electrical characteristics may be, for example, a voltage value, a current value, or an electrical resistance value. The electrical characteristics may be measured using the configuration of the battery manufacturing apparatus 1100 described above. In that case, the battery manufacturing apparatus 1100 may further include a device for applying a current or a voltage to the battery member 10 in order to measure the electrical characteristics.

Alternatively, a voltage value and a current value may be both measured as the electrical characteristics. In that case, for example, impedance between measurement terminals can be determined on the basis of a voltage signal and a current signal. When the battery member 10 has a structure including a plurality of the batteries connected in series, information regarding whether a satisfactory bonding state is ensured in what number battery among the plurality of batteries can also be obtained by analyzing a step response and frequency characteristics of the impedance.

In the battery manufacturing apparatus 1000 according to the first embodiment, the characteristics measured by the measurement device 200 may be thermal characteristics.

Stated in another way, in the battery manufacturing method according to the first embodiment, the characteristics measured by the measurement device 200 in the measurement step S1002 may be thermal characteristics.

With the above-described configuration, for example, change of the battery member 10 depending on temperature change can be measured with higher accuracy during the pressing of the battery member 10. As a result, the control of the pressing state by the controller can be performed with higher accuracy. Hence the battery member 10 can be pressed in a satisfactory manner without undergoing excessive and insufficient conditions.

Figure 4:
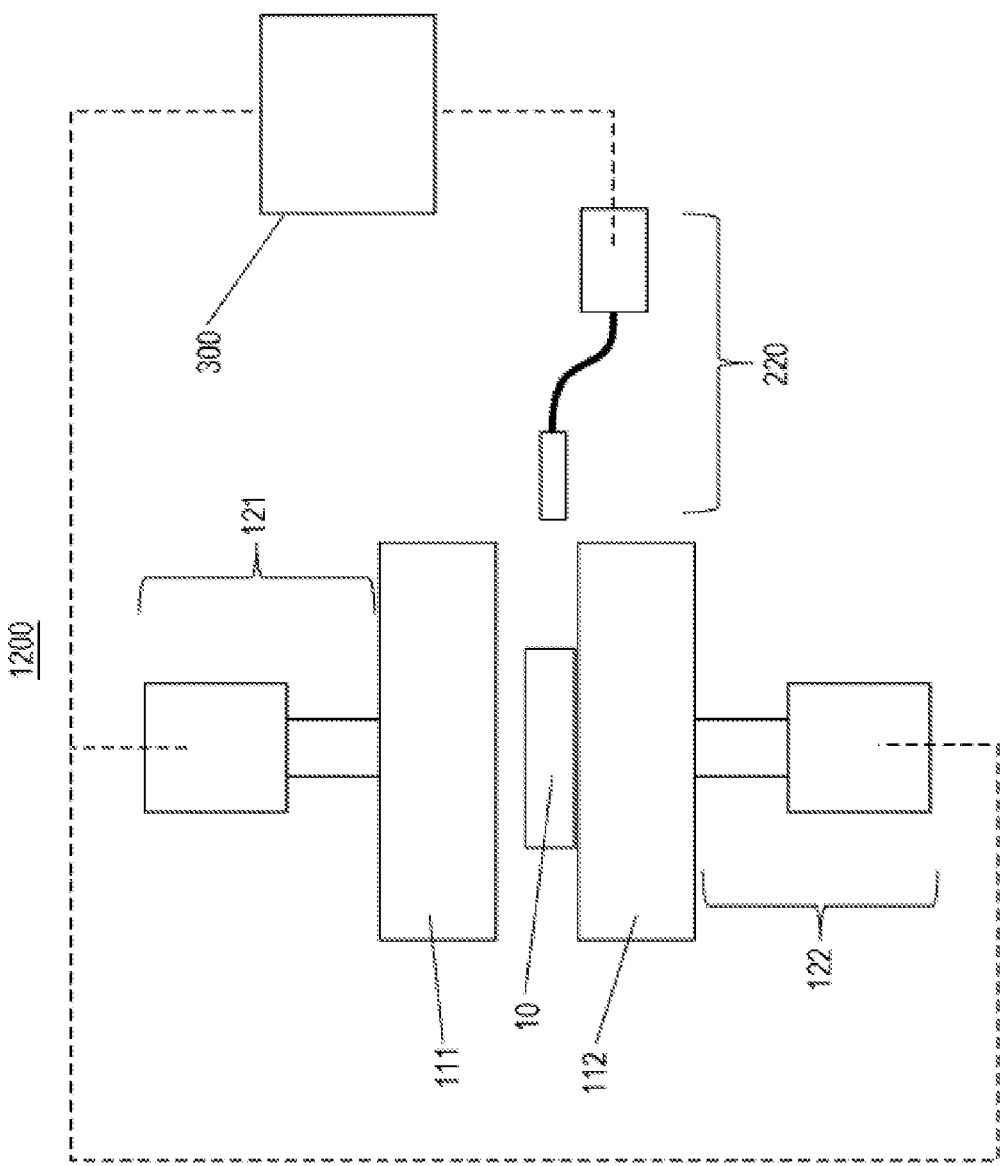
FIG. 4 is a block diagram schematically illustrating a configuration of still another battery manufacturing apparatus according to the first embodiment.

FIG. 4 is a block diagram schematically illustrating a configuration of still another battery manufacturing apparatus 1200 according to the first embodiment.

The battery manufacturing apparatus 1200 according to the first embodiment includes the following configuration in addition to the configuration of the above-described battery manufacturing apparatus 1000.

More specifically, the battery manufacturing apparatus 1200 according to the first embodiment includes, as the measurement device 200, a thermometer 220 (e.g., a non-contact thermometer).

The battery manufacturing apparatus 1200 according to the first embodiment employs thermal information (e.g., a result of sensing temperature) in the method of controlling the pressing (pressurization). As illustrated in FIG. 4, a temperature of the battery member 10 is precisely measured by the thermometer 220 from a direction along a section of the battery member 10. Therefore, fine temperature change can be measured with the progress of the pressing (pressurization). At a time when the temperature change has reached a predetermined value, the pressing pressure is reduced through the predetermined procedure. The battery member 10 is thereby released from the pressing. As a result, the battery member 10 can be fabricated in a satisfactory state without undergoing excessive and insufficient conditions.

In the battery manufacturing apparatus 1000 according to the first embodiment, the characteristics measured by the measurement device 200 may be acoustic characteristics.

Stated in another way, in the battery manufacturing method according to the first embodiment, the characteristics measured by the measurement device 200 in the measurement step S1002 may be acoustic characteristics.

With the above-described configuration, for example, the occurrence of a fine crack in the battery member 10 can be measured with higher accuracy during the pressing of the battery member 10. As a result, the control of the pressing state by the controller can be performed with higher accuracy. Hence the battery member 10 can be pressed in a satisfactory manner without undergoing excessive and insufficient conditions.

Figure 5:
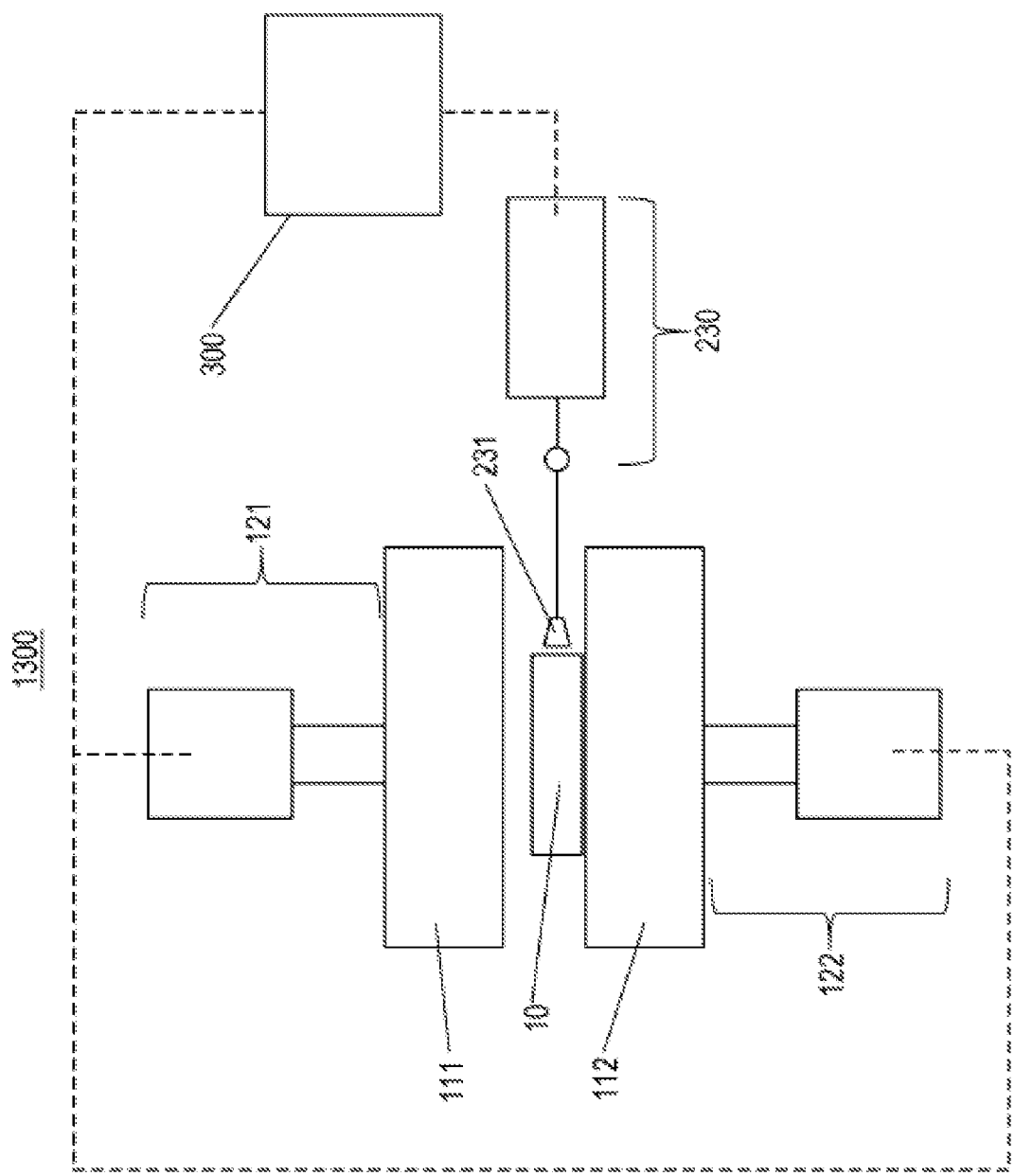
FIG. 5 is a block diagram schematically illustrating a configuration of still another battery manufacturing apparatus according to the first embodiment.

FIG. 5 is a block diagram schematically illustrating a configuration of still another battery manufacturing apparatus 1300 according to the first embodiment.

The battery manufacturing apparatus 1300 according to the first embodiment includes the following configuration in addition to the configuration of the above-described battery manufacturing apparatus 1000.

More specifically, the battery manufacturing apparatus 1300 according to the first embodiment includes, as the measurement device 200, an acoustic instrument 230 and a measurement terminal 231.

The battery manufacturing apparatus 1300 according to the first embodiment employs acoustic information (e.g., vibration) in the method of controlling the pressing (pressurization). As illustrated in FIG. 5, the pressing (pressurization) is performed on condition that the measurement terminal 231 of the acoustic instrument 230 is positioned to face the battery member 10 under the pressing (pressurization). For example, when a particular waveform pattern generated substantially at timing before or after a fine crack starts to be generated in any component of the battery member 10 is detected by the acoustic instrument 230 through the measurement terminal 231, the pressing (pressurization) is stopped at once. As a result, the battery member 10 can be fabricated in a state where the battery member 10 is avoided from undergoing excessive pressing.

In the battery manufacturing apparatus 1000 according to the first embodiment, the characteristics measured by the measurement device 200 may be external appearance characteristics.

Stated in another way, in the battery manufacturing method according to the first embodiment, the characteristics measured by the measurement device 200 in the measurement step S1002 may be external appearance characteristics.

With the above-described configuration, for example, the occurrence of change in the external appearance characteristics of the battery member 10 can be measured with higher accuracy during the pressing of the battery member 10. As a result, the control of the pressing state by the controller can be performed with higher accuracy. Hence the battery member 10 can be pressed in a satisfactory manner without undergoing excessive and insufficient conditions.

Figure 6:
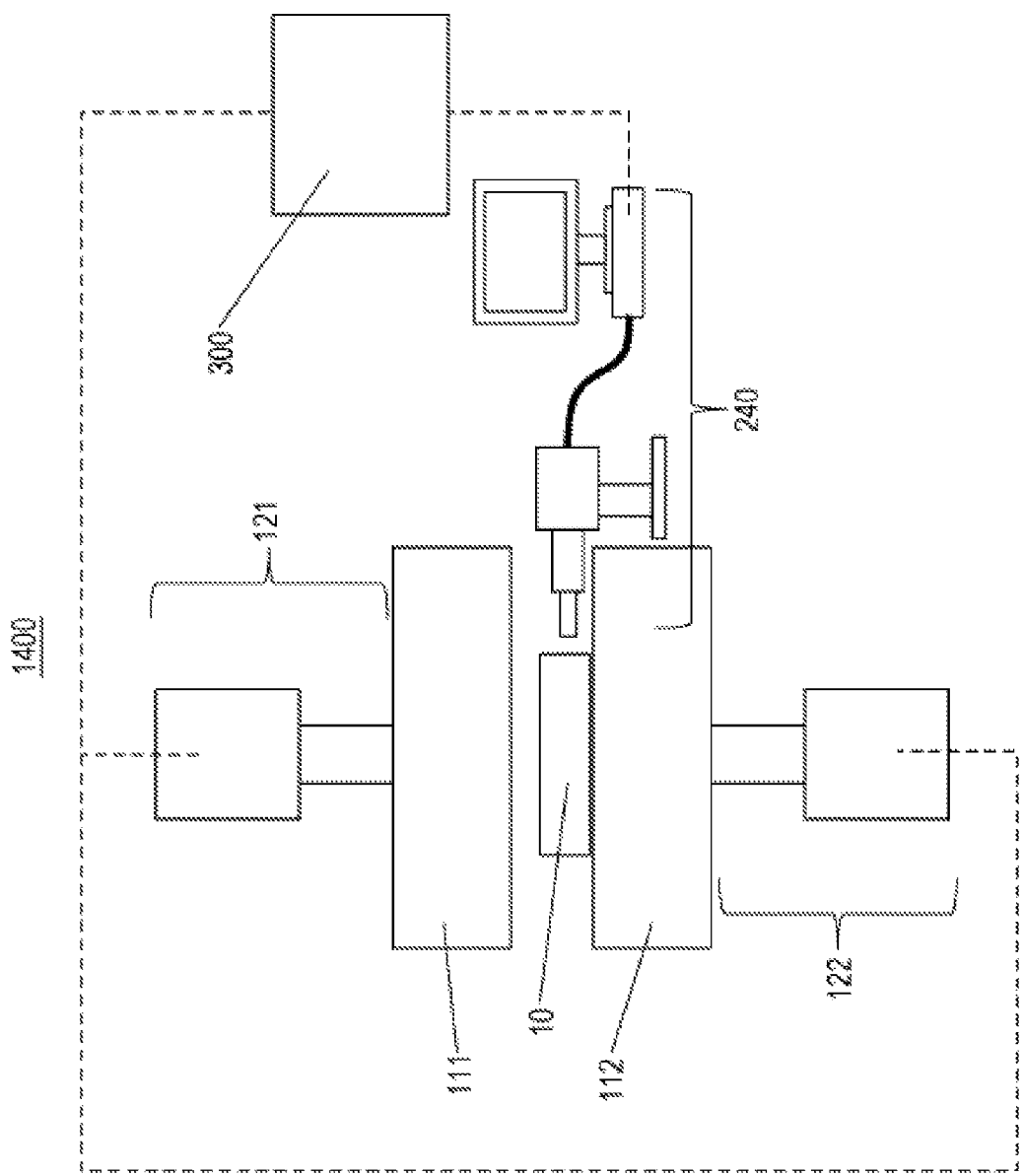
FIG. 6 is a block diagram schematically illustrating a configuration of still another battery manufacturing apparatus according to the first embodiment.

FIG. 6 is a block diagram schematically illustrating a configuration of still another battery manufacturing apparatus 1400 according to the first embodiment.

The battery manufacturing apparatus 1400 according to the first embodiment includes the following configuration in addition to the configuration of the above-described battery manufacturing apparatus 1000.

More specifically, the battery manufacturing apparatus 1400 according to the first embodiment includes, as the measurement device 200, an image capturing unit 240 (e.g., a camera or a microscope).

The battery manufacturing apparatus 1400 according to the first embodiment employs external appearance information (e.g., an image) in the method of controlling the pressing (pressurization). As illustrated in FIG. 6, the battery member 10 is observed by the image capturing unit 240 from the direction along the section of the battery member 10. Thereafter, comparative determination is performed on a specific image feature possibly appearing with the progress of the pressing (pressurization), the feature being stored in the controller 300, and a feature of the image obtained by the image capturing unit 240. As a result, the battery member 10 can be fabricated in a satisfactory pressing state without undergoing excessive and insufficient conditions.

[Exemplary Configurations of Battery Member]

Practical exemplary configurations of the battery member 10 will be described below.

Figure 7:
FIG. 7 is a sectional view schematically illustrating a configuration of components of a battery member in a manufacturing process.

FIG. 7 is a sectional view schematically illustrating a configuration of components of the battery member 10 in a manufacturing process.

As illustrated in FIG. 7, a positive electrode active material layer 12 is formed on a positive current collector 13. The positive current collector 13 may be a metal foil (e.g., a SUS foil or an Al foil). A thickness of the positive current collector 13 is 5 to 50 µm, for example.

A positive electrode active material contained in the positive electrode active material layer 12 may be a well-known positive electrode active material (e.g., lithium cobaltate or LiNO). A substance usable as the positive electrode active material is not limited to the above example, and various substances capable of releasing and accepting Li may be used optionally. Furthermore, a well-known solid electrolyte (e.g., an inorganic solid electrolyte) may be used as one of the materials contained in the positive electrode active material layer 12. The inorganic solid electrolyte may be, for example, a sulfide solid electrolyte or an oxide solid electrolyte. The sulfide solid electrolyte may be, for example, a mixture of $Li_2S:P_2S_5$. A surface of the positive electrode active material may be coated with a solid electrolyte. A conductive material (e.g., acetylene black), a joining binder (e.g., polyvinylidene fluoride), etc. may also be used as the materials contained in the positive electrode active material layer 12.

A positive electrode plate is fabricated by coating a paste-like paint, which is prepared by kneading the above-mentioned materials to be contained in the positive electrode active material layer 12 together with a solvent as appropriate, over the positive current collector 13, and by drying the coated paint. The positive electrode plate may be pressed to increase density of the positive electrode active material layer 12. The positive electrode active material layer 12 fabricated as described above has a thickness of 5 to 300 µm, for example.

Figure 8:
FIG. 8 is a sectional view schematically illustrating a configuration of other components of the battery member in the manufacturing process.

FIG. 8 is a sectional view schematically illustrating a configuration of other components of the battery member 10 in the manufacturing process.

As illustrated in FIG. 8, a negative electrode active material layer 14 is formed on a negative current collector 15. The negative current collector 15 may be a metal foil (e.g., a SUS foil or a Cu foil). A thickness of the negative current collector 15 is 5 to 50 µm, for example.

A negative electrode active material contained in the negative electrode active material layer 14 may be a well-known negative electrode active material (e.g., graphite). A material usable as the negative electrode active material is not limited to the above example, and various substances capable of releasing and accepting Li may be used optionally. Furthermore, a well-known solid electrolyte (e.g., an inorganic solid electrolyte) may be used as one of the materials contained in the negative electrode active material layer 14. The inorganic solid electrolyte may be, for example, a sulfide solid electrolyte or an oxide solid electrolyte. The sulfide solid electrolyte may be, for example, a mixture of $Li_2S:P_2S_5$. A conductive material (e.g., acetylene black), a joining binder (e.g., polyvinylidene fluoride), etc. may also be used as the materials contained in the negative electrode active material layer 14.

A negative electrode plate is fabricated by coating a paste-like paint, which is prepared by kneading the above-mentioned materials to be contained in the negative electrode active material layer 14 together with a solvent as appropriate, over the negative current collector 15, and by drying the coated paint. The negative electrode plate may be pressed to increase density of the negative electrode active material layer 14. The negative electrode active material layer 14 fabricated as described above has a thickness of 5 to 300 µm, for example.

The negative electrode may have a larger area than the positive electrode. With such a feature, it is possible to prevent a problem that may be caused by precipitation of lithium.

Figure 9:
FIG. 9 is a sectional view schematically illustrating a configuration of components of the battery member in the manufacturing process.

FIG. 9 is a sectional view schematically illustrating a configuration of components of the battery member 10 in the manufacturing process.

As illustrated in FIG. 9, a solid electrolyte layer 11 is formed on the positive electrode active material layer 12.

A solid electrolyte used in the solid electrolyte layer 11 may be a well-known solid electrolyte (e.g., an inorganic solid electrolyte). The inorganic solid electrolyte may be, for example, a sulfide solid electrolyte or an oxide solid electrolyte. The sulfide solid electrolyte may be, for example, a mixture of $Li_2S:P_2S_5$.

A joining binder (e.g., polyvinylidene fluoride) may also be used as one of the materials contained in the solid electrolyte layer 11. The solid electrolyte layer 11 is fabricated by coating a paste-like paint, which is prepared by kneading the above-mentioned materials to be contained in the solid electrolyte layer 11 together with a solvent as appropriate, over the positive electrode active material layer 12 (or the negative electrode active material layer 14), and by drying the coated paint. The solid electrolyte layer 11 may be lightly pressed to increase strength of the solid electrolyte layer 11. The solid electrolyte layer 11 fabricated as described above has a thickness of 1 to 100 µm, for example.

Figure 10:
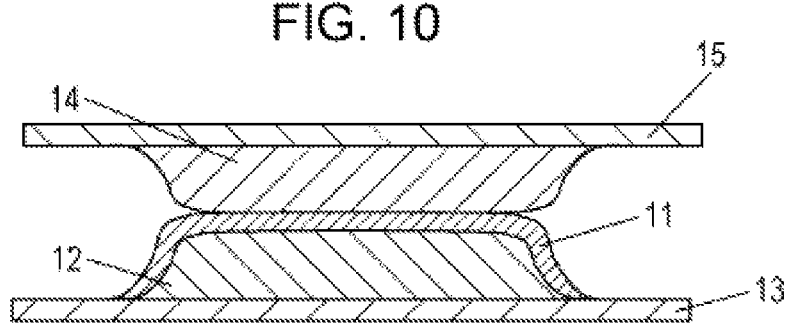
FIG. 10 is a sectional view schematically illustrating a configuration of the battery member.

FIG. 10 is a sectional view schematically illustrating a configuration of the battery member 10.

As illustrated in FIG. 10, the battery member 10 is constituted by stacking a positive electrode plate illustrated in FIG. 9, which includes the solid electrolyte layer 11 formed on the positive electrode active material layer 12, and the negative electrode plate illustrated in FIG. 8 in a state where the positive electrode active material layer 12 and the negative electrode active material layer 14 are opposed to each other with the solid electrolyte layer 11 interposed therebetween.

Alternatively, the battery member 10 may be constituted as follows.

Figure 11:
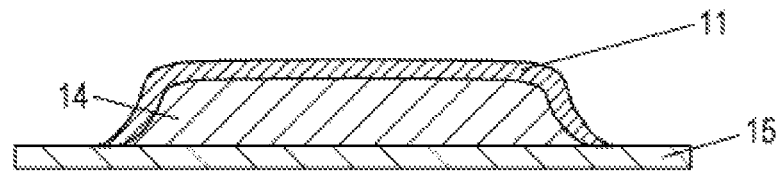
FIG. 11 is a sectional view schematically illustrating another configuration of the components of the battery member in the manufacturing process.

FIG. 11 is a sectional view schematically illustrating another configuration of the components of the battery member 10 in the manufacturing process.

As illustrated in FIG. 11, the solid electrolyte layer 11 is formed on the negative electrode active material layer 14.

Figure 12:
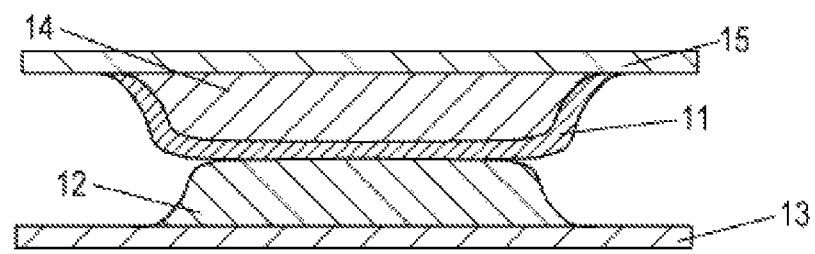
FIG. 12 is a sectional view schematically illustrating another configuration of the battery member.

FIG. 12 is a sectional view schematically illustrating another configuration of the battery member 10.

As illustrated in FIG. 12, the battery member 10 is constituted by stacking the positive electrode plate illustrated in FIG. 7, and a negative electrode plate illustrated in FIG. 11, which includes the solid electrolyte layer 11 formed on the negative electrode active material layer 14, in a state where the positive electrode active material layer 12 and the negative electrode active material layer 14 are opposed to each other with the solid electrolyte layer 11 interposed therebetween.

Figure 13:
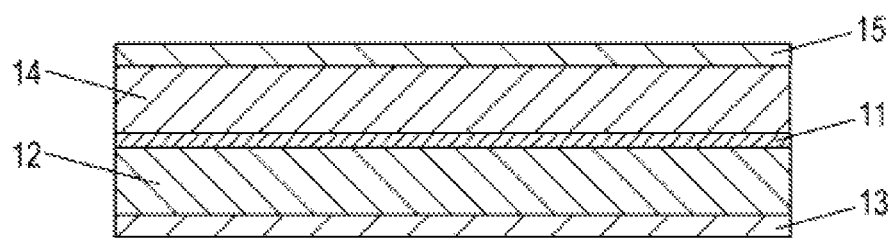
FIG. 13 is a sectional view schematically illustrating a configuration of a battery to be manufactured.

FIG. 13 is a sectional view schematically illustrating a configuration of a battery to be manufactured.

The battery member 10 illustrated in FIG. 10 or 12 is pressed (pressurized) by the pressing unit 100 described in the first embodiment (pressing step). As a result, a power generation element (unit battery), illustrated in FIG. 13, is manufactured.

In the case of the configuration illustrated in FIG. 10 or 12, the probe unit 211 in the above-described battery manufacturing apparatus 1100 illustrated in FIG. 3 may be connected, for example, to the positive electrode current collector 13 and the negative electrode current collector 15 in a one-to-one relation.

Alternatively, the battery member 10 may be constituted as follows.

FIGS. 14A and 14B are each a sectional view schematically illustrating another configuration of the battery member 10.

FIG. 14A illustrates a configuration in the case where the solid electrolyte layer 11 is coated on the positive electrode active material layer 12.

FIG. 14B illustrates a configuration in the case where the solid electrolyte layer 11 is coated on the negative electrode active material layer 14.

As illustrated in FIGS. 14A and 14B, the battery member 10 may constitute a battery of the bipolar structure. More specifically, in the battery member 10 illustrated in FIGS. 14A and 14B, the negative electrode current collector 15 is used as a current collector at an upper end. The positive electrode current collector 13 is used as a current collector at a lower end. A bipolar current collector 16 is used as each of other current collectors than the above current collectors at the upper and lower ends. The positive and negative electrode active material layers are formed on opposite surfaces of the bipolar current collector 16. The battery member 10 may have a structure including which the plurality of batteries formed as described above is connected in series. The bipolar current collector 16 may be a member in a single layer. As an alternative, the bipolar current collector 16 may be a current collector that is obtained, for example, by bonding, joining, or stacking separate current collectors into two or more layers.

In the case of the configuration illustrated in FIGS. 14A and 14B, the probe unit 211 in the above-described battery manufacturing apparatus 1100 illustrated in FIG. 3 may be connected, for example, to the negative electrode current collector 15 and the positive electrode current collector 13 in a one-to-one relation.

Alternatively, the battery member 10 may be constituted as follows.

Figure 15A:
FIGS. 15A and 15B are each a sectional view schematically illustrating still another configuration of the battery member.
Figure 15B:

FIGS. 15A and 15B are each a sectional view schematically illustrating still another configuration of the battery member 10.

FIG. 15A illustrates a configuration in the case of employing the positive electrode plate illustrated in FIG. 9.

FIG. 15B illustrates a configuration in the case of employing the negative electrode plate illustrated in FIG. 11.

As illustrated in FIGS. 15A and 15B, the battery member 10 may be a laminate in which one of the positive and negative electrode active material layers 12 and 14 and the solid electrolyte layer 11 are laminated on one surface of the current collector. Moreover, as illustrated in FIGS. 15A and 15B, a measurement counter electrode 17 (e.g., an auxiliary metal plate or a metal foil) is contacted with the solid electrolyte layer 11 on the side where the active material layer is not formed. Electrical measurement can be performed while the battery member is pressed in the above-mentioned state. A problem that may occur, for example, with charging for the measurement performed in a state where the active material layer is not present on the counter electrode side is negligible by setting a charging current to a small current.

In the case of the configuration illustrated in each of FIGS. 15A and 15B, the probe unit 211 in the above-described battery manufacturing apparatus 1100 illustrated in FIG. 3 may be connected, for example, to the current collector and the measurement counter electrode 17 in a one-to-one relation.

As described above, in the first embodiment, the battery member 10 may contain the solid electrolyte.

Furthermore, in the first embodiment, the battery member 10 may include a laminate in which the solid electrolyte layer containing the solid electrolyte and at least one of a positive electrode material layer (e.g., the cathode layer or the positive electrode active material layer) containing the positive electrode material (e.g., the cathode material or the positive electrode active material) and a negative electrode material layer (e.g., the anode layer or the negative electrode active material layer) containing the negative electrode material (e.g., the anode material or the negative electrode active material) are laminated.

With the configuration described above, the laminate of the solid electrolyte and the electrode material can be pressed in a satisfactory manner without undergoing excessive and insufficient conditions. In other words, the laminate can be avoided from being damaged due to excessive pressing, for example. Furthermore, respective densities of the solid electrolyte layer and the electrode material inside the battery member 10 or adhesion between the solid electrolyte and the electrode material therein can be avoided from becoming insufficient due to insufficient pressing, for example.

In an all-solid-state battery that is a battery containing a solid electrolyte, because the solid electrolyte is used instead of an electrolytic solution, a joining state between each of the positive electrode and the negative electrode and the solid electrolyte is more important. Although the all-solid-state battery can be fabricated by a thin-film lamination process, higher productivity is obtained in the case of employing a coating process. In the coating process, coated layers are pressed to increase density of each of the coated layers. Moreover, in the coating process, the positive electrode material layer, the negative electrode material layer, and the solid electrolyte layer are pressed to ensure close contact between adjacent two among those layers. In pressing operations performed in the above coating process, the pressing can be realized with the features of the present disclosure in a satisfactory manner without undergoing excessive and insufficient conditions.

The battery manufacturing method according to the first embodiment may further include the following steps.

The battery manufacturing method according to the first embodiment may include a positive electrode plate fabrication step of forming the positive electrode material layer on the positive electrode current collector, a negative electrode plate fabrication step of forming the negative electrode material layer on the negative electrode current collector, a solid electrolyte layer fabrication step of forming the solid electrolyte layer on one of the positive electrode material layer and the negative electrode material layer, a laminate fabrication step of arranging the positive electrode material layer and the negative electrode material layer to be positioned to face each other with the solid electrolyte layer interposed therebetween, and fabricating a laminate, and a laminate pressing step of pressing (pressurizing) the laminate from opposite sides externally of the current collectors and joining the layers of the laminate together.

Alternatively, the laminate fabrication step may include a step of forming the positive electrode material layer and the negative electrode material layer on both the sides of the solid electrolyte layer, a step of forming the positive electrode current collector on the outer side of the positive electrode material layer, and a step of forming the negative electrode current collector on the outer side of the negative electrode material layer.

Second Embodiment

A second embodiment will be described below. Description overlapped with the description of the above first embodiment is omitted as appropriate.

Figure 16:
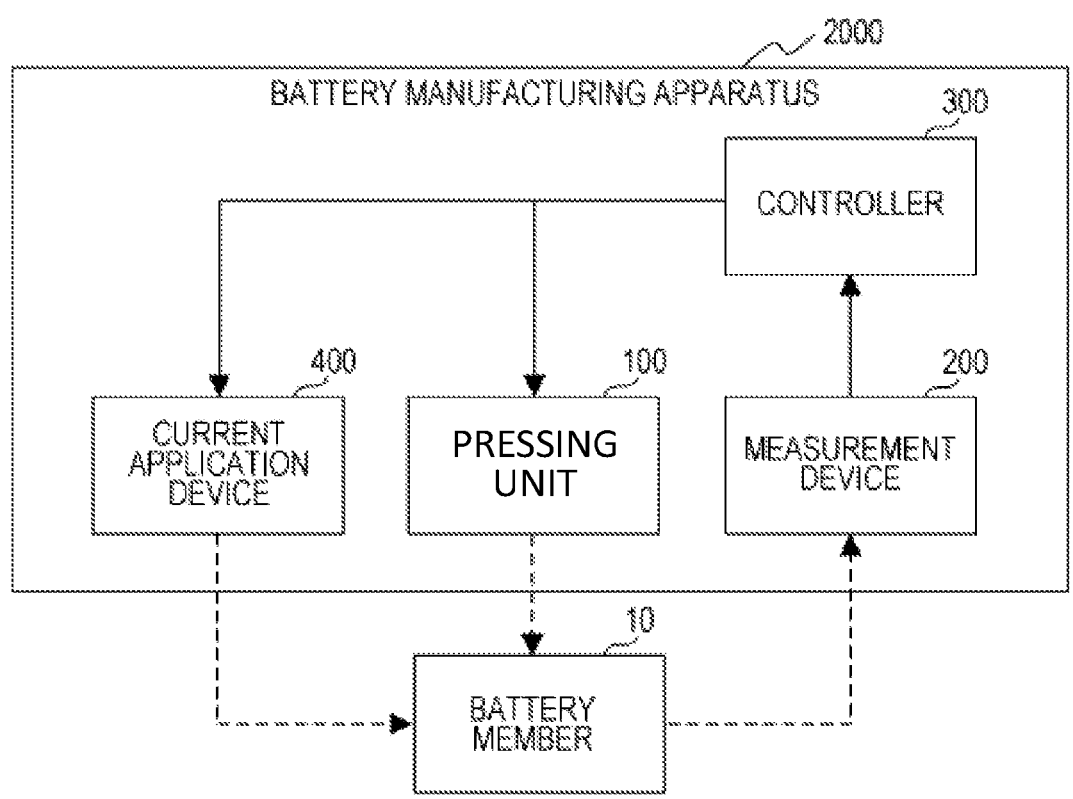
FIG. 16 is a block diagram schematically illustrating a configuration of a battery manufacturing apparatus according to a second embodiment.

FIG. 16 is a block diagram schematically illustrating a configuration of a battery manufacturing apparatus 2000 according to the second embodiment.

The battery manufacturing apparatus 2000 according to the second embodiment includes the following configuration in addition to the configuration of the above-described battery manufacturing apparatus 1000 according to the first embodiment.

More specifically, the battery manufacturing apparatus 2000 according to the second embodiment further includes a current application device 400 (i.e., current applying unit).

The current application device 400 applies a current to the battery member 10. The current application device 400 applies a predetermined current to the battery member 10 from a time $t_{v1}$ (see FIG. 18).

In a period after the time $t_{v1}$, the controller 300 executes a step of gradually increasing the pressing pressure over time, which is applied to the battery member 10 by the pressing unit 100.

In the second embodiment, a parameter of the characteristics measured by the measurement device 200 is a voltage.

The controller 300 stops, at a time $t_{v2}$, the step of gradually increasing the pressing pressure over time. The time $t_{v2}$ represents a point in time at which a measured voltage value obtained as the measurement result is reduced to a predetermined voltage value or below.

Figure 17:
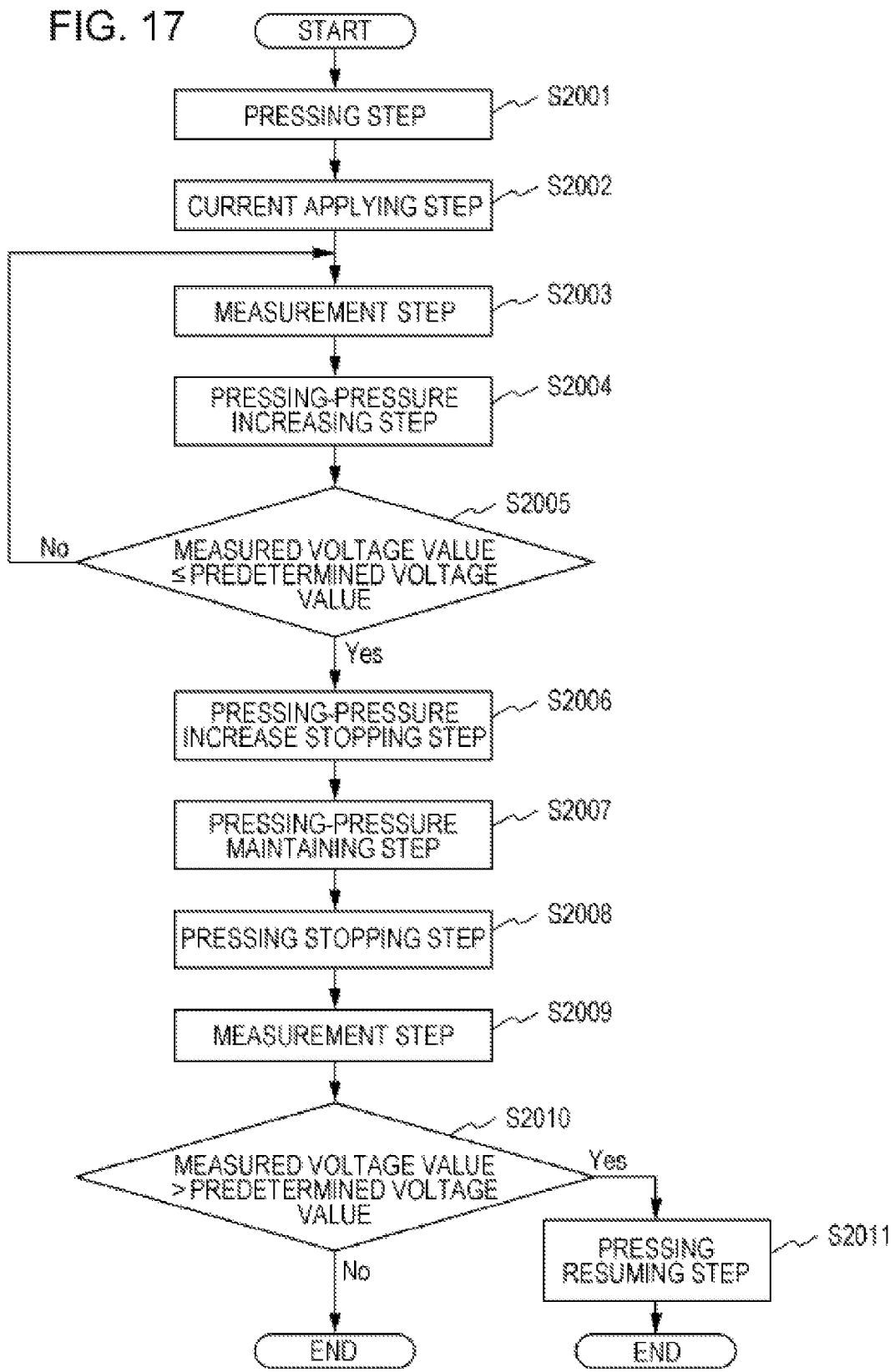
FIG. 17 is a flowchart illustrating a battery manufacturing method according to the second embodiment.

FIG. 17 is a flowchart illustrating a battery manufacturing method according to the second embodiment.

The battery manufacturing method according to the second embodiment further includes the following steps in addition to the steps of the battery manufacturing method according to the first embodiment.

Thus, the battery manufacturing method according to the second embodiment is a battery manufacturing method using the battery manufacturing apparatus 2000 according to the second embodiment. For example, the battery manufacturing method according to the second embodiment is a battery manufacturing method carried out in the battery manufacturing apparatus 2000 according to the second embodiment.

The battery manufacturing method according to the second embodiment further includes a current applying step S2002 (=step (d)).

The current applying step S2002 is a step of applying the predetermined current to the battery member 10 from the time $t_{v1}$ by the current application device 400.

In the battery manufacturing method according to the second embodiment, a control step includes a pressing-pressure increasing step S2004 (=step (C11)), and a pressing-pressure increase stopping step S2006 (=step (C12)).

The pressing-pressure increasing step S2004 is a step of, by the controller 300, gradually increasing the pressing pressure over time, which is applied to the battery member 10 by the pressing unit 100, during a period after the time $t_{v1}$.

In the second embodiment, a parameter of the characteristics measured in measurement steps S2003 and S2009 by the measurement device 200 is a voltage.

The pressing-pressure increase stopping step S2006 is a step of, by the controller 300, stopping the time-serial increase of the pressing pressure at the time $t_{v2}$. The time $t_{v2}$ represents the point in time at which the measured voltage value obtained as the measurement result is reduced to the predetermined voltage value or below.

According to the manufacturing apparatus or the manufacturing method described above, the battery member 10 can be avoided with higher accuracy from being pressed excessively.

The current application device 400 may include, for example, a current source and a lead wire. In other words, the current application device 400 may apply a current to the battery member 10 through the lead wire. In that case, the lead wire may be connected, for example, to a component (e.g., the current collector or the counter electrode) to which the probe unit 211 can be connected.

Furthermore, the current applying step S2002 may be executed after the pressing step S2001. Alternatively, the current applying step S2002 may be executed before the pressing step S2001.

In the battery manufacturing method according to the second embodiment, a control step may include a determination step S2005 between the pressing-pressure increasing step S2004 and the pressing-pressure increase stopping step S2006.

The determination step S2005 is a step of determining whether the measured voltage value is not larger than the predetermined voltage value.

If the determination result of the determination step S2005 is "Yes", the pressing-pressure increase stopping step S2006 is executed.

If the determination result of the determination step S2005 is "No", the control process may be executed again from the measurement step S2003, for example.

In the battery manufacturing apparatus 2000 according to the second embodiment, the controller 300 may maintain the pressing pressure at constant pressure from the time $t_{v2}$ to a time $t_{v3}$ later than the time $t_{v2}$.

Stated in another way, in the battery manufacturing method according to the second embodiment, the control step may further include a pressing-pressure maintaining step S2007 (=step (C13)).

The pressing-pressure maintaining step S2007 is a step of, by the controller 300, maintaining the pressing pressure at the constant pressure from the time $t_{v2}$ to the time $t_{v3}$ later than the time $t_{v2}$.

According to the manufacturing apparatus or the manufacturing method described above, the battery member 10 can be avoided with higher accuracy from being pressed insufficiently.

In the battery manufacturing apparatus 2000 according to the second embodiment, the controller 300 may stop the pressing, which is performed on the battery member 10 by the pressing unit 100, at the time $t_{v3}$ later than the time $t_{v2}$.

The current application device 400 may apply the predetermined current to the battery member 10 from the time $t_{v1}$ to a time $t_{v4}$ later than the time $t_{v3}$.

When the measured voltage value is increased beyond the predetermined voltage value in a period from the time $t_{v3}$ to the time $t_{v4}$, the controller 300 may resume the pressing of the battery member 10 by the pressing unit 100.

Stated in another way, in the battery manufacturing method according to the second embodiment, the control step may further include a pressing stopping step S2008 (=step (C14)) and a pressing resuming step S2011 (=step (C15)).

The pressing stopping step S2008 is a step of, by the controller 300, stopping the pressing of the battery member 10 by the pressing unit 100 at the time $t_{v3}$ later than the time $t_{v2}$.

In the current applying step S2002, the current application device 400 may apply the predetermined current to the battery member 10 from the time $t_{v1}$ to the time $t_{v4}$ later than the time $t_{v3}$.

The pressing resuming step S2011 is a step of, by the controller 300, resuming the pressing of the battery member 10 by the pressing unit 100 when the measured voltage value is increased beyond the predetermined voltage value in the period from the time $t_{v3}$ to the time $t_{v4}$.

According to the manufacturing apparatus or the manufacturing method described above, a stable state of the battery member 10 can be checked after release of the pressing. Thus, for example, when the stable state of the battery member 10 is not confirmed after the release of the pressing, the battery member 10 can be pressed again. As a result, the battery member 10 can be avoided with higher accuracy from being pressed insufficiently.

It is to be noted that the pressing resuming step S2011 may be executed, for example, by executing the individual steps illustrated in FIG. 17 again from the pressing step S2001.

Moreover, in the battery manufacturing method according to the second embodiment, the control step may include a measurement step S2009 and a determination step 2010 between the pressing stopping step S2008 and the pressing resuming step S2011.

The determination step S2010 is a step of determining whether the measured voltage value is larger than the predetermined voltage value.

If the determination result of the determination step S2010 is "Yes", the pressing resuming step S2011 is executed.

If the determination result of the determination step S2010 is "No", the control step may be ended, by way of example.

Figure 18:
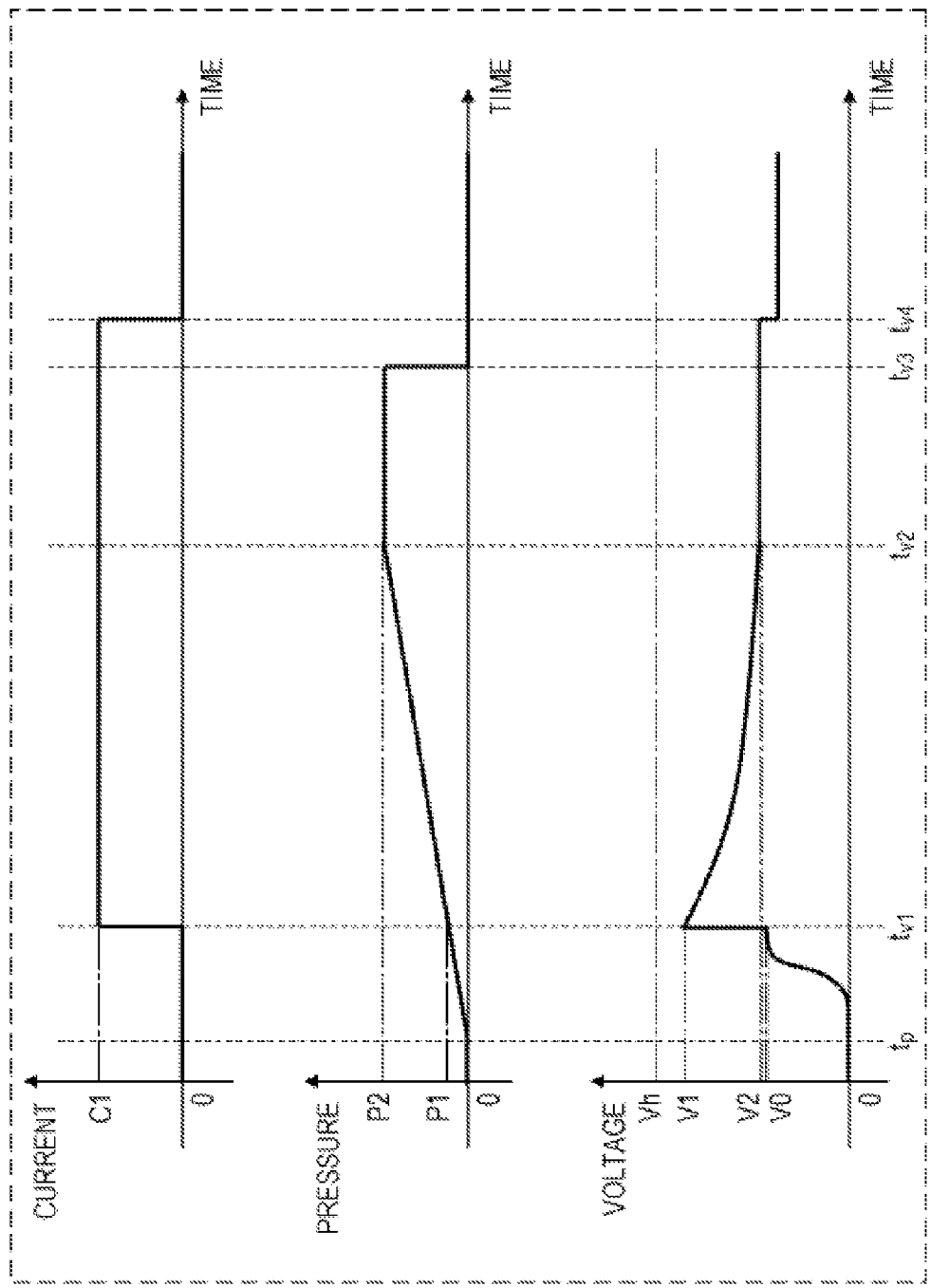
FIG. 18 is a graph depicting a measured voltage value when the battery manufacturing method according to the second embodiment is carried out.

FIG. 18 is a graph depicting a measured voltage value when the battery manufacturing method according to the second embodiment is carried out.

A time $t_p$ in FIG. 18 represents a point in time at which the pressing of the battery member 10 is started. At the start time ($t_p$) of the pressing, electrical contact between the positive electrode and the negative electrode is weak. Therefore, the battery member 10 does not function as a battery, and it cannot provide a predetermined voltage in a stage before charging. In other words, a very small voltage is obtained as the measured voltage value.

The time $t_{v1}$ in FIG. 18 represents a point in time at which application of a predetermined current C1 (mA) to the battery member 10 is started. From the time $t_{v1}$, charging is performed at the current C1 (mA) that is, e.g., 1/100 of a design capacity D (mAh) of the battery member 10 (i.e., C1=D/100). On that occasion, it is assumed that an upper limit voltage between the terminals is limited to Vh (V).

When the pressing pressure is gradually increased, the positive electrode and the negative electrode are electrically contacted with each other. Therefore, a voltage of several V is obtained in the state before the charging (i.e., before the application of the predetermined current C1). Then, the battery member exhibits an electromotive force V0 as the battery (at $t_{v1}$).

In the above stage, however, because the pressing is insufficient, the internal resistance of the battery member 10 is still high. Accordingly, the voltage rises sharply (to V1) with the application of the charging current. At that time, the measured voltage value reaches the upper limit voltage (Vh) between the terminals in some cases. If the measured voltage value reaches the upper limit voltage between the terminals, the applied current value is reduced such that the measured voltage value is held not higher than the upper limit voltage between the terminals.

When the pressing time is prolonged, or when the pressing pressure is increased, particles inside the battery member 10 come into a state more closely connected to each other. Therefore, the rise of the voltage between the terminals is gradually reduced even with the application of the charging current.

The time $t_{v2}$ in FIG. 18 represents a point in time at which the measured voltage value reaches a predetermined voltage value (V2). The time $t_{v3}$ in FIG. 18 represents a point in time at which the pressing is stopped. The pressing pressure is held constant for a predetermined time from the time ($t_{v2}$) at which the measured voltage value (i.e., the voltage between the terminals) has reached the predetermined voltage value (V2). Thereafter, the battery member 10 is released from the pressing (at $t_{v3}$). With the above process, the battery member 10 can be fabricated in a satisfactory pressing state without undergoing excessive and insufficient conditions.

The time $t_{v4}$ in FIG. 18 represents a point in time at which the application of the predetermined current C1 to the battery member 10 is stopped. The current is applied until the time $t_{v4}$ after releasing the battery member 10 from the pressing. This enables the battery member 10 to be checked on whether it is in the stable joining state in a stage after the release of the pressing. If the measured voltage value rises when the battery member 10 is released from the pressing (in a period of $t_{v3}$ to $t_{v4}$), the battery member 10 may be pressed again in a similar manner to that described above.

The current applied to the battery member 10 may be a direct current such as illustrated in FIG. 18. Alternatively, the current applied to the battery member 10 may be a current having suitable one of other waveforms.

Figure 19:
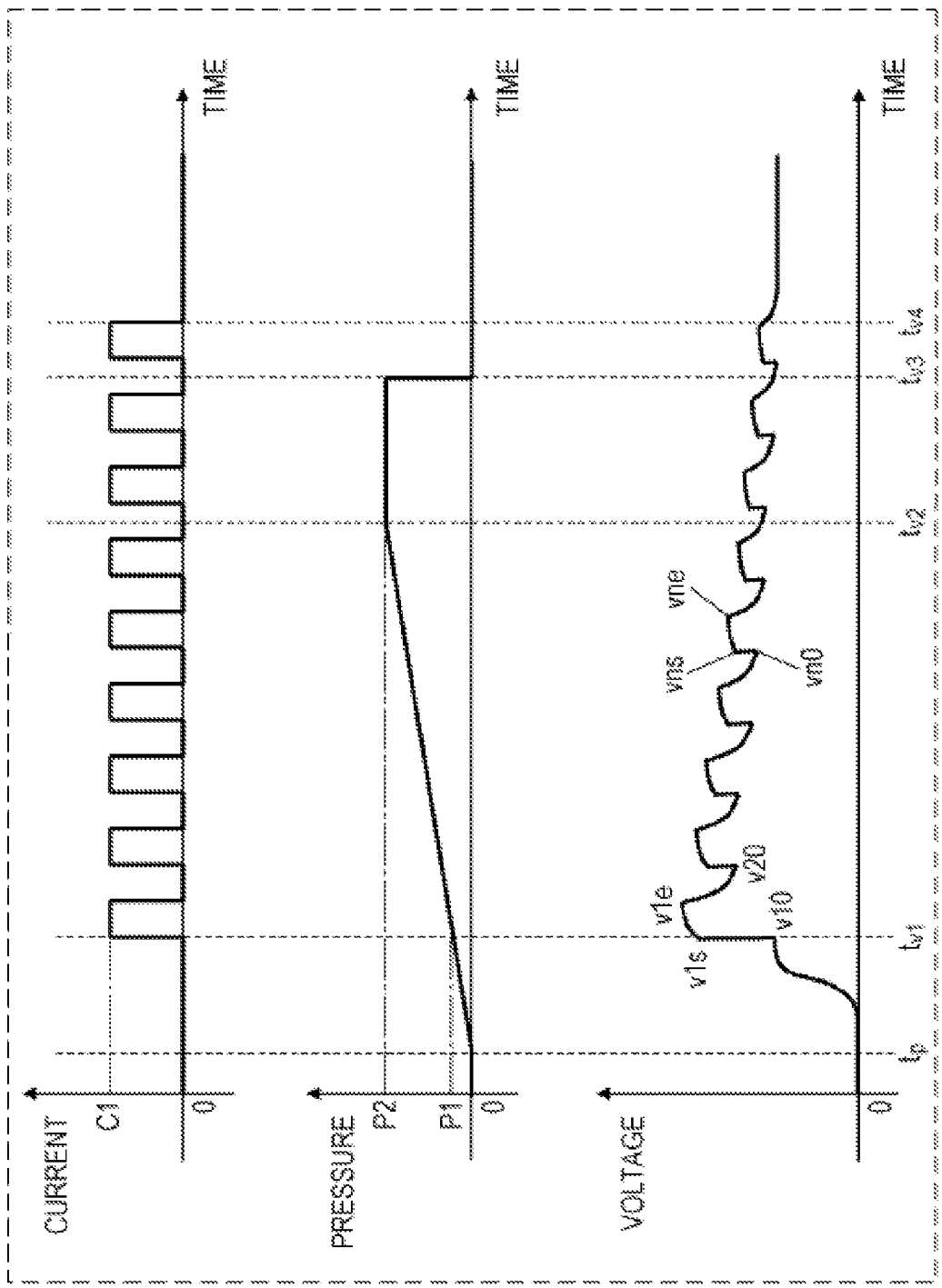
FIG. 19 is a graph depicting a measured voltage value when the battery manufacturing method according to the second embodiment is carried out.

FIG. 19 is a graph depicting a measured voltage value when the battery manufacturing method according to the second embodiment is carried out.

FIG. 19 represents an example in which a current having a rectangular wave with an amplitude set to the predetermined current value C1 is used as the current applied to the battery member 10. When the rectangular current depicted in FIG. 19 is applied, the measured voltage value repeats fluctuations corresponding to the application of the rectangular current. For example, as depicted in FIG. 19, with the first application of the rectangular current, the voltage rises quickly from v10 to 0s and then gently rises until vie. When the application of the current is interrupted thereafter, the voltage lowers to v20 and undergoes the next application of the rectangular current. The timing of releasing the battery member 10 from the pressing may be, for example, the timing at which the voltage is reduced to a predetermined value or below during a process of interrupting the application of the current. Alternatively, the battery member 10 may be released from the pressing when a value of vns−vn0 or vne−vns is reduced to a predetermined value or below.

Third Embodiment

A third embodiment will be described below. Description overlapped with the description of the above first and second embodiments is omitted as appropriate.

Figure 20:
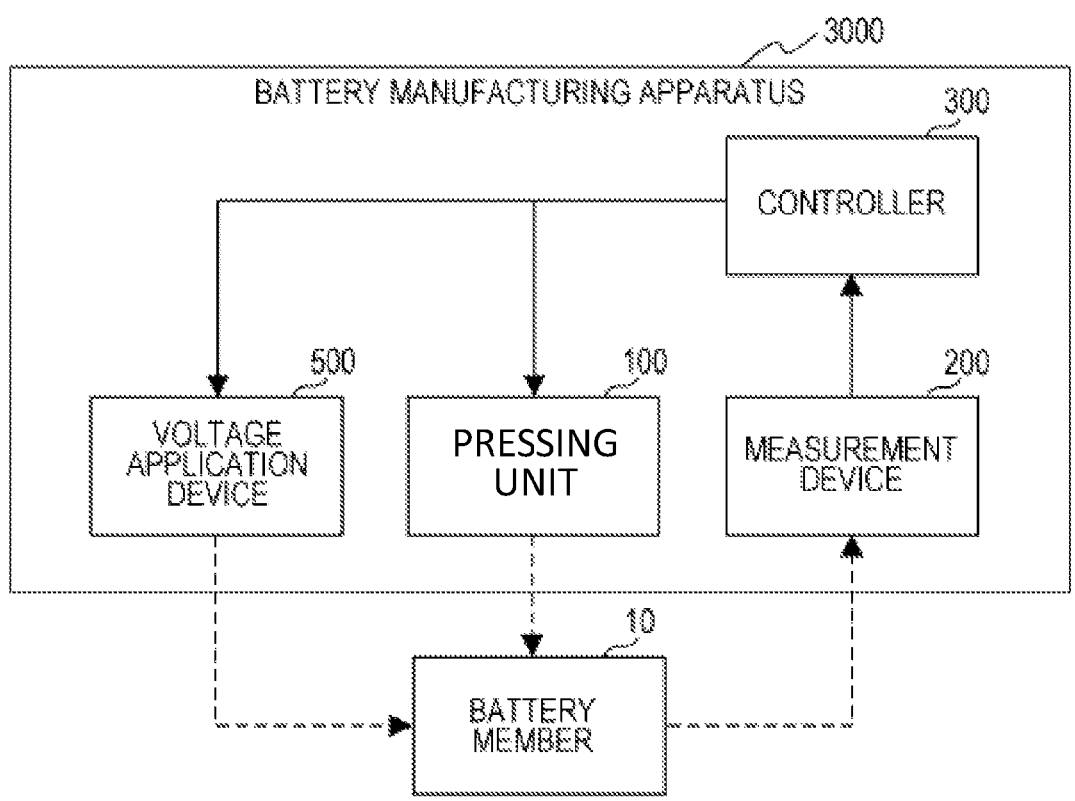
FIG. 20 is a block diagram schematically illustrating a configuration of a battery manufacturing apparatus according to a third embodiment.

FIG. 20 is a block diagram schematically illustrating a configuration of a battery manufacturing apparatus 3000 according to the third embodiment.

The battery manufacturing apparatus 3000 according to the third embodiment includes the following configuration in addition to the configuration of the above-described battery manufacturing apparatus 1000 according to the first embodiment.

More specifically, the battery manufacturing apparatus 3000 according to the third embodiment further includes a voltage application device 500 (i.e., voltage applying unit).

The voltage application device 500 applies a voltage to the battery member 10. The voltage application device 500 applies a predetermined voltage to the battery member 10 from a time $t_{i1}$ (see FIG. 22).

In a period after the time $t_{i1}$, the controller 300 executes a step of gradually increasing the pressing pressure over time, which is applied to the battery member 10 by the pressing unit 100.

In the third embodiment, a parameter of the characteristics measured by the measurement device 200 is a current.

The controller 300 stops, at a time $t_{i2}$, the step of gradually increasing the pressing pressure over time. The time $t_{i2}$ represents a point in time at which a measured current value obtained as the measurement result is increased to a predetermined current value or above.

Figure 21:
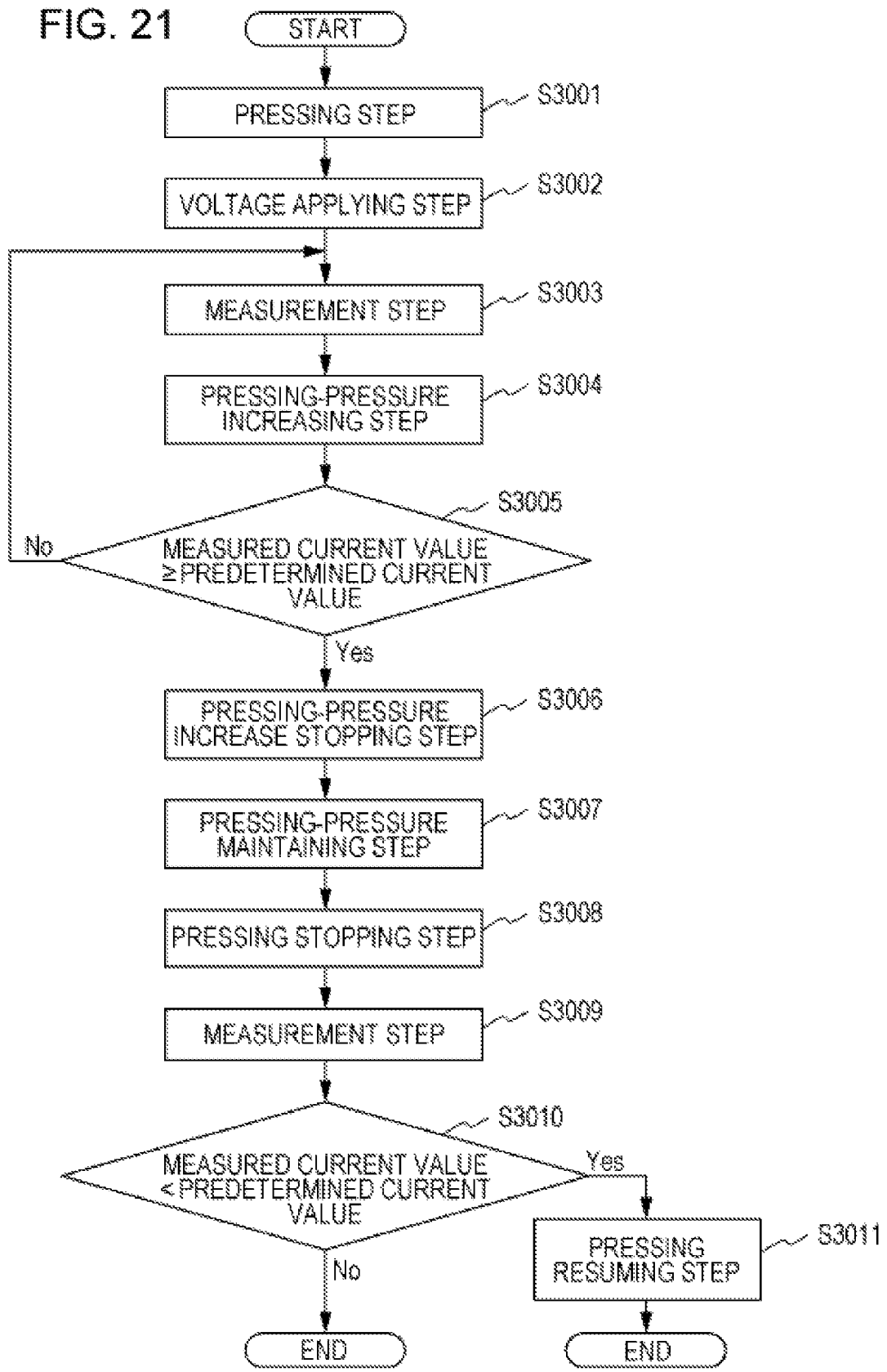
FIG. 21 is a flowchart illustrating a battery manufacturing method according to the third embodiment.

FIG. 21 is a flowchart illustrating a battery manufacturing method according to the third embodiment.

The battery manufacturing method according to the third embodiment further includes the following steps in addition to the steps of the battery manufacturing method according to the first embodiment.

Thus, the battery manufacturing method according to the third embodiment is a battery manufacturing method using the battery manufacturing apparatus 3000 according to the third embodiment. For example, the battery manufacturing method according to the third embodiment is a battery manufacturing method carried out in the battery manufacturing apparatus 3000 according to the third embodiment.

The battery manufacturing method according to the third embodiment further includes a voltage applying step S3002 (=step (e)).

The voltage applying step S3002 is a step of applying the predetermined voltage to the battery member 10 from the time $t_{i1}$ by the voltage application device 500.

In the battery manufacturing method according to the third embodiment, a control step includes a pressing-pressure increasing step S3004 (=step (C21)), and a pressing-pressure increase stopping step S3006 (=step (C22)).

The pressing-pressure increasing step S3004 is a step of, by the controller 300, gradually increasing the pressing pressure over time, which is applied to the battery member 10 by the pressing unit 100, during a period after the time $t_{i1}$.

In the third embodiment, a parameter of the characteristics measured in measurement steps S3003 and S3009 by the measurement device 200 is a current.

The pressing-pressure increase stopping step S3006 is a step of, by the controller 300, stopping the time-serial increase of the pressing pressure at the time $t_{i2}$. The time $t_{i2}$ represents the point in time at which the measured current value obtained as the measurement result is increased to the predetermined current value or above.

According to the manufacturing apparatus or the manufacturing method described above, the battery member 10 can be avoided with higher accuracy from being pressed excessively.

The voltage application device 500 may include, for example, a voltage source and a lead wire. In other words, the voltage application device 500 may apply a voltage to the battery member 10 through the lead wire. In that case, the lead wire may be connected, for example, to a component (e.g., the current collector or the counter electrode) to which the probe unit 211 can be connected.

Furthermore, the voltage applying step S3002 may be executed after the pressing step S3001. Alternatively, the voltage applying step S3002 may be executed before the pressing step S3001.

In the battery manufacturing method according to the third embodiment, a control step may include a determination step S3005 between the pressing-pressure increasing step S3004 and the pressing-pressure increase stopping step S3006.

The determination step S3005 is a step of determining whether the measured current value is not smaller than the predetermined current value.

If the determination result of the determination step S3005 is "Yes", the pressing-pressure increase stopping step S3006 is executed.

If the determination result of the determination step S3005 is "No", the control process may be executed again from the measurement step S3003, for example.

In the battery manufacturing apparatus 3000 according to the third embodiment, the controller 300 may maintain the pressing pressure at constant pressure from the time $t_{i2}$ to a time $t_{i3}$ later than the time $t_{i2}$.

Stated in another way, in the battery manufacturing method according to the third embodiment, the control step may further include a pressing-pressure maintaining step S3007 (=step (C23)).

The pressing-pressure maintaining step S3007 is a step of, by the controller 300, maintaining the pressing pressure at the constant pressure from the time $t_{i2}$ to the time $t_{i3}$ later than the time $t_{i2}$.

According to the manufacturing apparatus or the manufacturing method described above, the battery member can be avoided with higher accuracy from being pressed insufficiently.

In the battery manufacturing apparatus 3000 according to the third embodiment, the controller 300 may stop the pressing, which is performed on the battery member 10 by the pressing unit 100, at the time $t_{i3}$ later than the time $t_{i2}$.

The voltage application device 500 may apply the predetermined voltage to the battery member 10 from the time $t_{i1}$ to a time $t_{i4}$ later than the time $t_{i3}$.

When the measured current value is reduced beyond the predetermined current value in a period from the time $t_{i3}$ to the time $t_{i4}$, the controller 300 may resume the pressing of the battery member 10 by the pressing unit 100.

Stated in another way, in the battery manufacturing method according to the third embodiment, the control step may further include a pressing stopping step S3008 (=step (C24)) and a pressing resuming step S3011 (=step (C25)).

The pressing stopping step S3008 is a step of, by the controller 300, stopping the pressing of the battery member 10 by the pressing unit 100 at the time $t_{i3}$ later than the time $t_{i2}$.

In the voltage applying step S3002, the voltage application device 500 may apply the predetermined voltage to the battery member 10 from the time $t_{i1}$ to the time $t_{i4}$ later than the time $t_{i3}$.

The pressing resuming step S3011 is a step of, by the controller 300, resuming the pressing of the battery member 10 by the pressing unit 100 when the measured current value is reduced beyond the predetermined current value in the period from the time $t_{i3}$ to the time $t_{i4}$.

According to the manufacturing apparatus or the manufacturing method described above, a stable state of the battery member 10 can be checked after release of the pressing. Thus, for example, when the stable state of the battery member 10 is not confirmed after the release of the pressing, the battery member 10 can be pressed again. As a result, the battery member 10 can be avoided with higher accuracy from being pressed insufficiently.

It is to be noted that the pressing resuming step S3011 may be executed, for example, by executing the individual steps illustrated in FIG. 21 again from the pressing step S3001.

Moreover, in the battery manufacturing method according to the third embodiment, the control step may include a measurement step S3009 and a determination step 3010 between the pressing stopping step S3008 and the pressing resuming step S3011.

The determination step S3010 is a step of determining whether the measured current value is smaller than the predetermined current value.

If the determination result of the determination step S3010 is "Yes", the pressing resuming step S3011 is executed.

If the determination result of the determination step S3010 is "No", the control step may be ended, by way of example.

Figure 22:
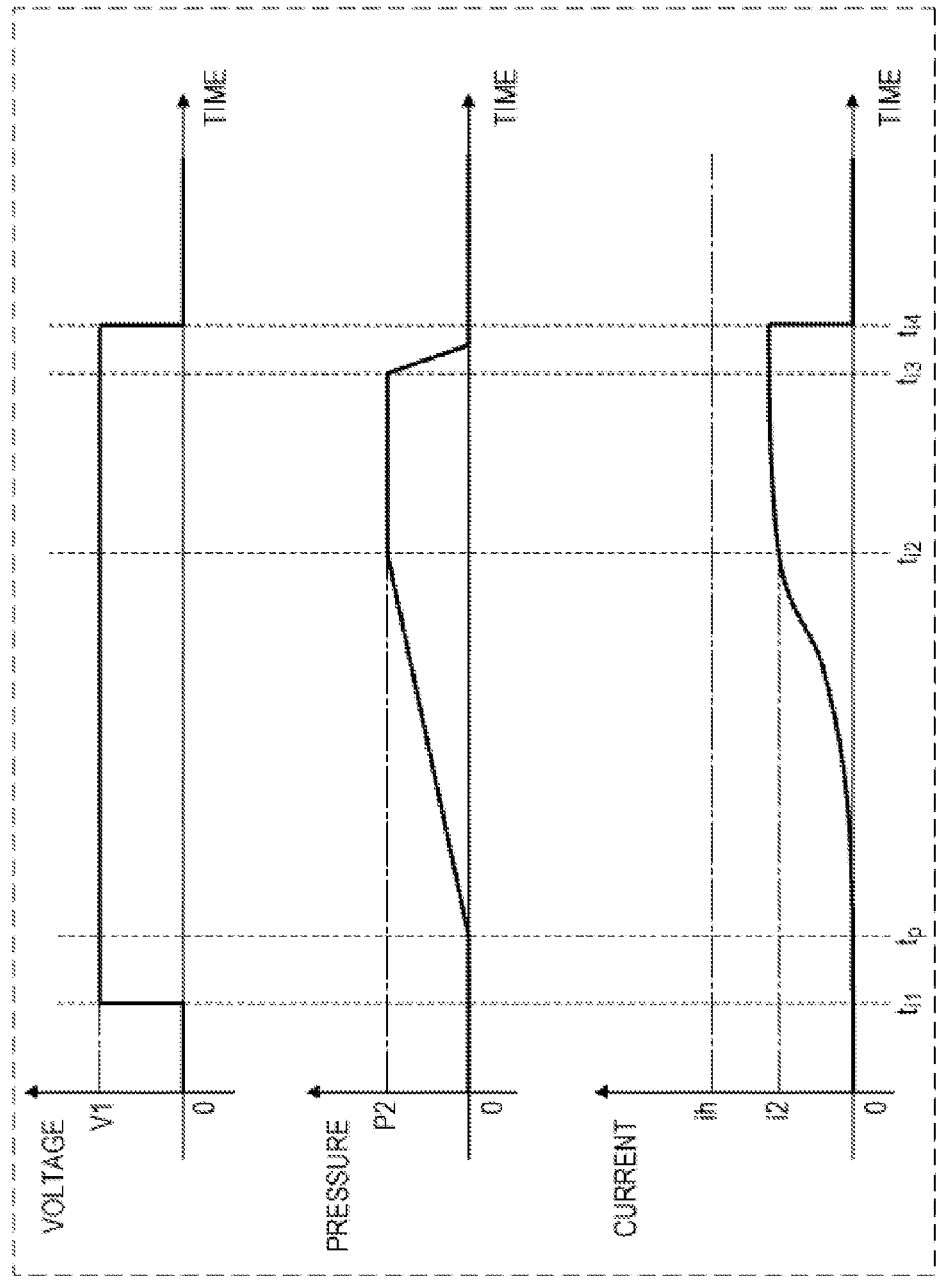
FIG. 22 is a graph depicting a measured voltage value when the battery manufacturing method according to the third embodiment is carried out.

FIG. 22 is a graph depicting a measured current value when the battery manufacturing method according to the third embodiment is carried out.

The time $t_{i1}$ in FIG. 22 represents a point in time at which application of a predetermined voltage V1 (V) to the battery member 10 is started. From the time $t_{i1}$, the predetermined voltage V1 (V) is applied, for example, between the positive electrode current collector and the negative electrode current collector of the battery member 10. On that occasion, it is assumed that an upper limit current between the terminals is limited to ih (mA).

A time $t_p$ in FIG. 22 represents a point in time at which the pressing of the battery member 10 is started. At the start time ($t_p$) of the pressing, electrical contact between the positive electrode and the negative electrode is weak, and hence a current hardly flows. Thereafter, when the pressing pressure is gradually increased, the positive electrode and the negative electrode are electrically contacted with each other. Therefore, the current starts to flow through the battery member 10 in a slowly increasing way.

In the above stage, however, because the pressing is insufficient, the internal resistance of the battery member 10 is high. Accordingly, the current value is still small. When the pressing time is prolonged, or when the pressing pressure is increased, particles inside the battery member 10 come into a state more closely connected to each other. Therefore, the current flowing through the battery member 10 rises gradually.

The time $t_{i2}$ in FIG. 22 represents a point in time at which the measured current value reaches a predetermined current value (i2). The time $t_{i3}$ in FIG. 22 represents a point in time at which the pressing is stopped. The pressing pressure is held constant for a predetermined time from the time ($t_{i2}$) at which the measured current value has reached the predetermined current value (i2). Thereafter, the pressing of the battery member 10 is stopped, and the pressing pressure is gradually reduced (from $t_{i3}$) in accordance with a predetermined program. With the above process, the battery member 10 can be fabricated in a satisfactory pressing state without undergoing excessive and insufficient conditions.

The time $t_{i4}$ in FIG. 22 represents a point in time at which the application of the predetermined voltage V1 to the battery member 10 is stopped. The voltage is applied until the time $t_{i4}$ after releasing the battery member 10 from the pressing. This enables the battery member 10 to be checked on whether it is in the stable joining state in a stage after the release of the pressing. If the measured current value lowers when the battery member 10 is released from the pressing (in a period of $t_{i3}$ to $t_{i4}$), the battery member 10 may be pressed again in a similar manner to that described above.

The voltage applied to the battery member 10 may be a direct-current voltage such as illustrated in FIG. 22. Alternatively, the voltage applied to the battery member 10 may be a voltage having suitable one of other waveforms (e.g., a voltage having a rectangular waveform).

The present disclosure can be suitably utilized in a variety of applications (e.g., various energy devices including batteries, various ceramic devices, and carbon-material devices) where it is demanded, for example, to ensure good performance, and to prevent damage caused by excessive pressing.

What is claimed is:

1. A battery manufacturing method using a battery manufacturing apparatus,
the battery manufacturing apparatus including a pressing unit, a measurement device, and a controller,
the battery manufacturing method comprising steps of:
(a) pressing a battery member by the pressing unit;
(b) measuring, after the pressing step (a), by the measurement device, characteristics of the battery member, which has been pressed by the pressing unit; and
(c) controlling, after the measurement step (b), by the controller, a state of pressing of the battery member by the pressing unit in accordance with a measurement result of the measurement device.

2. The battery manufacturing method according to claim 1, wherein
the control step (c) includes a step of (c1) controlling, by the controller, pressing pressure, which is applied to the battery member by the pressing unit, in accordance with the measurement result of the measurement device.

3. The battery manufacturing method according to claim 1, wherein
the control step (c) includes a step of (c2) controlling, by the controller, a time of the pressing, which is performed on the battery member by the pressing unit, in accordance with the measurement result of the measurement device.

4. The battery manufacturing method according to claim 1, wherein
in the measurement step (b), the characteristics measured by the measurement device are electrical characteristics.

5. The battery manufacturing method according to claim 4, wherein
the battery manufacturing apparatus includes a current application device that applies a current to the battery member,
the battery manufacturing method further comprises a step of (d) applying, by the current application device, a predetermined current to the battery member from a time $t_{v1}$,
the control step (c) includes a step of (c11) increasing, by the controller, the pressing pressure over time, which is applied to the battery member by the pressing unit, in a period after the time $t_{v1}$,
in the measurement step (b), a parameter of the characteristics measured by the measurement device is a voltage, and
the control step (c) includes a step of (c12) stopping, by the controller, a time-serial increase of the pressing pressure at a time $t_{v2}$;
where the time $t_{v2}$ is a point in time at which a measured voltage value as the measurement result is reduced to a predetermined voltage value or below.

6. The battery manufacturing method according to claim 5, wherein
the control step (c) includes a step of (c13) maintaining, by the controller, the pressing pressure at constant pressure from the time $t_{v2}$ to a time $t_{v3}$ later than the time $t_{v2}$.

7. The battery manufacturing method according to claim 5, wherein
the control step (c) includes a step of (c14) stopping, by the controller, the pressing of the battery member by the pressing unit at a time $t_{v3}$ later than the time $t_{v2}$,
in the applying step (d), the current application device applies the predetermined current to the battery member from the time $t_{v1}$ to a time $t_{v4}$ later than the time $t_{v3}$, and
the control step (c) includes a step of (c15) resuming, by the controller, the pressing of the battery member by the pressing unit when the measured voltage value is increased beyond the predetermined voltage value in a period from the time $t_{v3}$ to the time $t_{v4}$.

8. The battery manufacturing method according to claim 4, wherein
the battery manufacturing apparatus includes a voltage application device that applies a voltage to the battery member,
the battery manufacturing method further comprises a step of (e) applying, by the voltage application device, a predetermined voltage to the battery member from a time $t_{i1}$,
the control step (c) includes a step of (c21) increasing, by the controller, the pressing pressure over time, which is applied to the battery member by the pressing unit, in a period after the time $t_{i1}$,
in the measurement step (b), a parameter of the characteristics measured by the measurement device is a current, and
the control step (c) includes a step of (c22) stopping, by the controller, a time-serial increase of the pressing pressure at a time $t_{i2}$;
where the time $t_{i2}$ is a point in time at which a measured current value as the measurement result is increased to a predetermined current value or above.

9. The battery manufacturing method according to claim 8, wherein
the control step (c) includes a step of (c23) maintaining, by the controller, the pressing pressure at constant pressure from the time $t_{i2}$ to a time $t_{i3}$ later than the time $t_{i2}$.

10. The battery manufacturing method according to claim 8, wherein
the control step (c) includes a step of (c24) stopping, by the controller, the pressing of the battery member by the pressing unit at a time $t_{i3}$ later than the time $t_{i2}$,
in the applying step (e), the voltage application device applies the predetermined voltage to the battery member from the time $t_{i1}$ to a time $t_{i4}$ later than the time $t_{i3}$, and
the control step (c) includes a step of (c25) resuming, by the controller, the pressing of the battery member by the pressing unit when the measured current value is reduced beyond the predetermined current value in a period from the time $t_{i3}$ to the time $t_{i4}$.

11. The battery manufacturing method according to claim 1, wherein
in the measurement step (b), the characteristics measured by the measurement device are thermal characteristics.

12. The battery manufacturing method according to claim 1, wherein
in the measurement step (b), the characteristics measured by the measurement device are acoustic characteristics.

13. The battery manufacturing method according to claim 1, wherein
the battery member includes a laminate in which a solid electrolyte layer containing a solid electrolyte and at least one of a positive electrode material layer containing a positive electrode material and a negative electrode material layer containing a negative electrode material are laminated.

14. A battery manufacturing apparatus comprising:
a pressing unit that presses a battery member;
a measurement device that measures characteristics of the battery member having been pressed by the pressing unit; and
a controller that controls a state of pressing of the battery member by the pressing unit in accordance with a measurement result of the measurement device.

* * * * *